United States Patent
Schweizer et al.

(10) Patent No.: US 7,276,013 B2
(45) Date of Patent: Oct. 2, 2007

(54) PARALLEL SHIFT TRANSMISSION AND METHOD FOR CONTROLLING IT

(75) Inventors: Alexander Schweizer, Buehl (DE); Frank Stengel, Buehl-Neusatz (DE); Martin Fuss, Karlsruhe (DE); Matthias Ehrlich, Buehl (DE); Behzad Nazari, Nuertingen (DE); Jens Martin, Sinzheim-Kartung (DE); Joachim Hirt, Oberkirch (DE); Martin Zimmermann, Sasbach (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 180 days.

(21) Appl. No.: 11/199,910

(22) Filed: Aug. 9, 2005

(65) Prior Publication Data

US 2006/0089231 A1    Apr. 27, 2006

(30) Foreign Application Priority Data

Aug. 11, 2004    (DE) .................. 10 2004 038 954

(51) Int. Cl.
*B60W 10/04*    (2006.01)
*B60W 10/10*    (2006.01)
*F16H 3/08*    (2006.01)

(52) U.S. Cl. .......................................... 477/36; 74/330
(58) Field of Classification Search .................. 477/34, 477/36; 74/330, 331, 335, 336 R
See application file for complete search history.

(56) References Cited

U.S. PATENT DOCUMENTS

| | | | | |
|---|---|---|---|---|
| 5,367,914 A | * | 11/1994 | Ordo | .......................... 74/331 |
| 6,378,675 B1 | * | 4/2002 | Kundermann et al. | ..... 192/3.27 |
| 6,951,526 B2 | * | 10/2005 | Kuhstrebe et al. | ............. 477/97 |
| 7,107,870 B2 | * | 9/2006 | Kuhstrebe et al. | ........ 74/336 R |
| 7,171,867 B2 | * | 2/2007 | McCrary et al. | .............. 74/331 |

FOREIGN PATENT DOCUMENTS

DE    10102028 A1    8/2001

* cited by examiner

*Primary Examiner*—Tisha Lewis
(74) *Attorney, Agent, or Firm*—Simpson & Simpson, PLLC

(57) ABSTRACT

The invention relates to a parallel shift transmission having a drive unit and two partial transmissions, each connectable to the drive unit via a friction clutch and each having a plurality of gear ratio steps.

12 Claims, 1 Drawing Sheet

PARALLEL SHIFT TRANSMISSION AND METHOD FOR CONTROLLING IT

CROSS-REFERENCE TO RELATED APPLICATIONS

This application claims priority of German Patent Application No. 10 2004 038 954.3, filed Aug. 11, 2004, which application is incorporated herein by reference.

FIELD OF THE INVENTION

The invention relates to a parallel shift transmission for a motor vehicle comprising at least two partial transmissions, each having a friction clutch and a transmission input shaft that can be connected via a plurality of engageable gear ratios to a transmission output shaft that is common to both partial transmissions.

BACKGROUND OF THE INVENTION

Transmission structures of this type and their mode of operation are known, for example, from German Patent Application 101 02 028 A1. In parallel shift transmissions of this type, the torque of the drive unit is generally transmitted to a transmission output shaft and, thus, via a differential to the drive wheels in such a manner that a gear ratio step is engaged in a partial transmission between the transmission input shaft and the transmission output shaft and the friction clutch associated with this transmission input shaft is connected to the drive shaft of the drive unit. On the other transmission input shaft, for the disengaged friction clutch that is associated with this transmission input shaft, a gear ratio step is generally already shifted with which the vehicle is to be operated further after a shift operation. In this context, a shift operation is carried out as an overlap shift in which the clutch transmitting the torque at the time is gradually disengaged while the other friction clutch is engaged. Moreover, it may be advantageous to operate the motor vehicle, for example, during a starting off operation using a power split when gear ratios are engaged in both partial transmissions, at least one of the two clutches being operated in a slipping state as a result of the varying differential speeds between drive shaft and transmission input shafts.

When there are gear ratios engaged on both transmission input shafts, situations that are unfavorable for driving safety may arise, for example, at an unsuitable speed of a transmission input shaft. Moreover, components of the drive train, such as the transmission, the clutches or the drive unit may be destroyed or their service life reduced.

SUMMARY OF THE INVENTION

The object of the present invention is therefore to design a parallel shift transmission in such a manner that situations that are critical for safety and that affect the service life of a drive train are prevented or reduced. Moreover, a corresponding method for preventing or reducing such situations is proposed. This objective must be achievable in a cost-beneficial and less expensive way.

This objective is achieved via a parallel shift transmission having at least two partial transmissions, each partial transmission comprising a transmission input shaft coupleable via a friction clutch to a drive shaft of a drive unit, which may be an internal combustion engine with or without additional support of a hybrid component, such as an electrical machine, and having a plurality of gear ratio steps engageable between the transmission input shaft and a transmission output shaft common to both partial transmissions, a prescribable maximum speed of the transmission input shaft associated with this gear ratio step being prescribed for each gear ratio step, and, for gear ratio steps in the two partial transmissions that are to be shifted or have been shifted simultaneously and have a higher or lower gear ratio step, the speed of the transmission input shaft having the gear ratio step with the higher ratio being limited.

The parallel shift transmission may have dry friction clutches or wet friction clutches that are operated in a liquid bath, the clutches being electrically operated via a mechanical clutch actuation system or electrically with an interposed hydrostatic or hydraulic pressure that acts on a slave cylinder, is provided by the pressure supply device and controlled via valves. It has been shown that so-called active clutches, which are disengaged when not impinged by the actuation elements, have an especially high safety aspect, because when there is a failure of the actuation elements, both clutches cannot simultaneously transmit torque. However, for special designs, it may also be advantageous to use passive clutches, which are engaged in the non-impinged state, or a mixture of active and passive clutches. The structure of the transmission may also be of such a configuration that the transmission input shafts or the transmission output shafts, because of the small structural space, are designed separately or in a hollow-shaft form, one of the shafts at least partially surrounding a second shaft concentrically and the individual transmission steps preferably being formed of gear pairs that comprise a movable gear and a fixed gear, the movable gear being connectable to the shaft that carries it via corresponding transmission actuators, thereby carrying out a shift of this gear ratio stage. In this context, the transmission actuator system can actuate the gear ratio steps in the form of an H-pattern or as a gear selector drum system, it being possible to drive the transmission actuator system electrically via one or two electric motors or hydraulically via positioning cylinders. Disposing the whole transmission in such a manner that the gear ratios are alternately distributed over the two partial transmissions has proven to be advantageous. If the gear ratio steps are assigned natural numbers with the ratio decreasing, then, for example, the gear ratio steps having odd numbers are disposed on one partial transmission and the gear ratio steps having even numbered assignment are disposed on the second partial transmission. The reverse gear is provided in an advantageous manner on one of the two partial transmissions. What is noteworthy here is that the gear ratio of a gear ratio step, for example, in a gear pair, decreases in speed as the gear ratio increases due to the quotients of the number of teeth of the gear wheel of the transmission input shaft via the number of teeth of the transmission output shaft, i.e. the low ratios are provided for the high speed ranges and the higher ratios for lower speeds and starting gears.

If two gear ratio steps are simultaneously engaged in a transmission of this type, for example, due to defective transmission actuators or a jamming of a gear wheel or when starting out with two gears or driving with one active and one pre-selected gear ratio step, it is possible to keep driving if one of the two friction clutches is engaged. Therefore, in the case of a gear ratio of a partial transmission that can no longer be disengaged, the associated friction clutch is advantageously disengaged and the vehicle is still operated, but just with an interruption in pulling force during a shift operation between two gear ratio steps on the same transmission input shaft. If the gear ratio of a gear ratio step that is to be engaged in this manner is lower than the gear ratio of the still engaged gear ratio step on the other transmission input shaft, then in accordance with the invention the speed of the transmission input shaft of the still functioning partial transmission is limited to the extent that it does not cause damage to the drive train as a result of the higher gear ratio of the engaged gear ratio step in the non-functioning partial transmission. For example, at an excessive speed the clutch disk of the defective partial transmission could burst and cause damage or the bearing of the transmission input shaft could sustain damages.

According to a concept of the invention, to limit this transmission input shaft speed of the defective transmission, the selection of the gear ratio steps yet to be shifted in the still functioning partial transmission may be limited. In particular, if an intervention in the controller of the drive unit is not desired, this manner of proceeding may be advantageous. In this context it has been shown that a selection for a still permissible gear ratio i (max) may be estimated according to equation 1 below for a still engageable gear ratio for a gear ratio step having the gear ratio i(D) that is still engaged on the other transmission input shaft without the risk of damage:

$$i(\max) = \frac{N(\max, A)}{N(\max, K)} \cdot i(D), \qquad (\text{Eq. 1})$$

N (max, A) signifying the maximum speed of the drive unit, for example, the speed at which an internal combustion engine runs into the speed limiter, and N (max, K) indicating the maximum operating speed of the transmission input shaft, for example, the permissible speed for which a clutch disk is permitted within the context of measuring the burst resistance. Of course, these values may be prescribed according to the discretion of an expert in the field and adapted by a controller over the course of service life.

According to another conception of the invention, it may be provided that all gear ratio steps are released for a shift on the still functional partial transmission, the speed of the drive unit being limited in such a manner that the partial transmission having an engaged, for example, jamming gear ratio is not subjected to any impermissible speed. It has been shown that the maximum permissible speed of the drive unit N (max, A, 1), in order to prevent a defect or damage to the drive train, may be limited in an advantageous manner according to the following equation:

$$N(\max, A, 1) = \frac{i(a)}{i(D)} \cdot N(\max, K) \qquad (\text{Eq. 2})$$

In this case i(a) signifies the gear ratio of the intact gear ratio step that has been engaged or is to be engaged, i(D), as mentioned above, represents the defective gear ratio step, and N (max, K) represents—as mentioned above—the maximum speed of the transmission input shaft of the defective partial transmission that can be permitted without causing damage. It is evident that such a limitation of the selection of the gears or of the limitation of the speed has validity in the same way for a starting-off operation of the vehicle having two engaged gears, as soon as one of the two clutches of the partial transmission is in the gripping state. In this context, a gear ratio step having a higher gear ratio may likewise undergo an impermissible speed increase so that there may be a limitation corresponding to the speed of the drive unit and/or the selection of the starting gear ratios is determined even beforehand for a starting-off operation when the speed range of the drive unit up to the speed limiter is exhausted.

The two previously proposed possibilities for limiting the speed of the partial transmission in which a gear ratio step is engaged using a higher gear ratio may be advantageously combined with each other. The selection of which of the two methods is applied in this context may be made a function of parameters that are attributable to a behavior of the driver or to a manner of operating the motor vehicle. For example, such a selection may be made as a function of a sport mode, in which the driver manually selects the gear ratio steps, a comfort mode, in which the gear ratio steps are automatically engaged, a kickdown signal, the braking state of the vehicle, the coolant or transmission oil temperature, the road condition, the inclination of the roadway, etc.

BRIEF DESCRIPTION OF THE DRAWINGS

An exemplary embodiment of the method of the invention is explained in detail below in the single FIGURE.

DETAILED DESCRIPTION OF THE INVENTION

Figure 1:
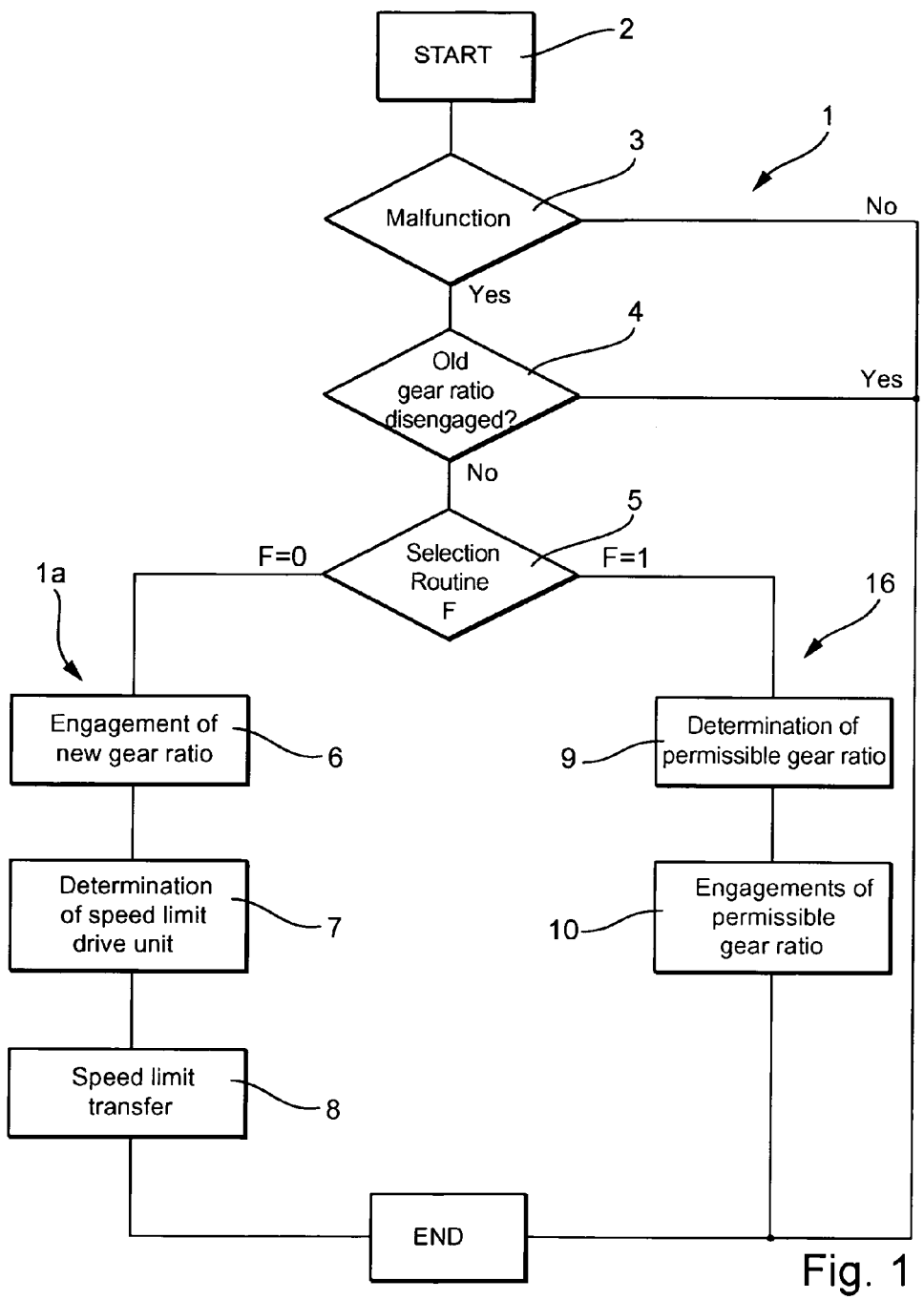

Method 1 begins with a start condition and a subsequent branch 3 in which a determination is made of whether there is a malfunction of the transmission controller. Such a malfunction may, for example, be the breakage of a shift finger or another component so that an engaged gear ratio step can no longer be disengaged or a jamming of a final control element for engaging or disengaging a gear ratio step so that the transmission actuators provided for this can no longer disengage the gear ratio step. If there is no malfunction, the routine is terminated immediately. In the detection of a malfunction, which may be accomplished, for example, via the evaluation of responses of the transmission actuator to the controller responsible for controlling the transmission, a check is made of whether an engaged gear ratio step has been disengaged. If the gear ratio step that is supposed to be disengaged is disengaged, the routine is terminated. Whether a gear ratio step is still engaged may be determined from the evaluation of sensor signals of the drive train. For example, a speed or torque evaluation of the drive unit and/or the speed of one of the transmission input shafts may be evaluated, wherein the torque transmission behavior of the clutches and at least one wheel speed, which can provide information about the transmission input speed when a gear ratio step is engaged, may be added for the evaluation. If it is plausible from these data that the gear ratio step to be disengaged is still engaged, a suitable routine is established in another branch 5, by means of which an excessive speed on the transmission input shaft with the still-engaged gear ratio step is limited. The selection may be determined as a function of vehicle parameters or driver-specific behavior, it being possible to assign to the corresponding selection criteria—as was not conclusively mentioned above—a control character F, as a function of which a routine is selected at that time. For example, the branch at F=0 occurs in a routine 1*a* in which a gear ratio step suitable for the continued movement of the vehicle that is not limited in other respects is engaged in block 6. In step 7, as a function of the gear ratio of this gear ratio step, a speed limit for the drive unit is established under the aforementioned conditions using, for example, the aforementioned equation 2, at which speed limit no damage to the drive train occurs due to excessive speeds of the transmission input shaft with the defective gear ratio step. In the following block 8, the speed limit determined in block 7 is transferred to a controller specified for controlling the speeds. Next, the routine is terminated. The regulation of the drive unit is corrected accordingly for observance of the speed limit. In the case of a selection of routine 1*b* by setting the control character F=1 in block 9, a maximum permissible gear ratio is determined based on, for example, equation 1 as specified above. In block 10, corresponding to the driving situation, a gear ratio step is engaged that has a gear ratio as specified in block 9. Thereafter, routine 1*b* is terminated. Of course, routine 1 in corresponding vehicles may also be realized in such a manner that only routine 1*a* or routine 1*b* is used. Of course, in specially designed exemplary embodiments, the application of both routines 1*a*, 1*b* may be applied in that the maximum permissible gear ratio and the speed of the drive unit are limited.

What is claimed is:

1. A parallel shift transmission for a motor vehicle having at least two partial transmissions, each of said at least two partial transmissions comprising a transmission input shaft that is coupleable to a drive shaft of a drive unit via a friction clutch and a plurality of gear ratio steps that are engageable between the transmission input shaft and an output shaft, wherein for each of said plurality of gear ratio steps a prescribable maximum speed of the transmission input shaft associated with said each of said plurality of gear ratio steps is set and in the case of gear ratio steps that have a higher and a lower gear ratio step and are to be simultaneously engaged in the two partial transmissions, the speed of the transmission input shaft having the gear ratio step with the higher ratio is limited.

2. The parallel shift transmission as described in claim 1, wherein the speed of said transmission input shaft having the higher gear ratio step is limited to the maximum speed of the gear ratio step having the higher gear ratio.

3. The parallel shift transmission as described in one of claims 1, wherein a selection for shifting a transmission step on the transmission shaft not associated with the transmission shaft having the gear ratio step with the higher gear ratio is limited as a function of the gear ratio of the higher gear ratio step.

4. The parallel shift transmission as described in claim 3, wherein, before reaching the maximum speed, an engaged gear ratio step that would lead to an exceeding of the maximum speed of the gear ratio step having the higher gear ratio during engagement of the friction clutch assigned to this gear ratio step is disengaged.

5. The parallel shift transmission as described in claim 3, wherein a gear ratio step to be shifted that would lead to an exceeding of the maximum speed of the gear ratio step having the higher gear ratio during engagement of the friction clutch assigned to this gear ratio step is not engaged.

6. The parallel shift transmission as described in claim 3, wherein the gear ratio step to be engaged that would lead to an exceeding of the maximum speed of the gear ratio step having the higher gear ratio during engagement of the friction clutch assigned to this gear ratio step is engaged under the condition that a speed of the drive unit to be regulated by a controller is regulated in such a manner that the maximum speed of the gear ratio step having the higher speed is not exceeded.

7. The parallel shift transmission as described in claim 2, wherein a selection for shifting a transmission step on the transmission shaft not associated with the transmission shaft having the gear ratio step with the higher gear ratio is limited as a function of the gear ratio of the higher gear ratio step.

8. The parallel shift transmission as described in claim 7, wherein, before reaching the maximum speed, an engaged gear ratio step that would lead to an exceeding of the maximum speed of the gear ratio step having the higher gear ratio during engagement of the friction clutch assigned to this gear ratio step is disengaged.

9. The parallel shift transmission as described in claim 7, wherein a gear ratio step to be shifted that would lead to an exceeding of the maximum speed of the gear ratio step having the higher gear ratio during engagement of the friction clutch assigned to this gear ratio step is not engaged.

10. The parallel shift transmission as described in claim 7, wherein the gear ratio step to be engaged that would lead to an exceeding of the maximum speed of the gear ratio step having the higher gear ratio during engagement of the friction clutch assigned to this gear ratio step is engaged under the condition that a speed of the drive unit to be regulated by a controller is regulated in such a manner that the maximum speed of the gear ratio step having the higher speed is not exceeded.

11. A method for operating a parallel shift transmission in a motor vehicle having at least two partial transmissions, wherein each of said at least two partial transmissions comprises a transmission input shaft that is coupleable to a drive shaft of a drive unit via a friction clutch and a plurality of gear ratio steps that are engageable between the transmission input shaft and an output shaft comprising, setting for each gear ratio step a prescribable maximum speed of the transmission input shaft associated with this gear ratio step and, in the case of gear ratio steps that have a higher and a lower gear ratio step and are to be simultaneously shifted in the two partial transmissions, limiting the speed of the transmission input shaft having the gear ratio step with the higher ratio.

12. The method as described in claim 11 for use in an emergency operating mode, further comprising activating said emergency operating mode if said gear ratio step cannot be disengaged in at least one of said at least two partial transmissions.

* * * * *